United States Patent
Aittama et al.

(10) Patent No.: US 7,364,170 B2
(45) Date of Patent: Apr. 29, 2008

(54) WHEEL SKI MOUNT

(76) Inventors: David C. Aittama, 37586 S. Entry La., Chassell, MI (US) 49916-9256; Paul DuMonthier, 913 Maple St., Lake Linden, MI (US) 49945

( * ) Notice: Subject to any disclaimer, the term of this patent is extended or adjusted under 35 U.S.C. 154(b) by 177 days.

(21) Appl. No.: 11/386,434

(22) Filed: Mar. 22, 2006

(65) Prior Publication Data

US 2007/0235956 A1    Oct. 11, 2007

(51) Int. Cl.
 *B62D 39/00* (2006.01)
(52) U.S. Cl. .................. 280/33.992; 280/10; 280/8
(58) Field of Classification Search ........... 280/33.992, 280/8, 10, 11, 9, 43.11, 47.34, 47.35, 47.371, 280/19.1
See application file for complete search history.

(56) References Cited

U.S. PATENT DOCUMENTS

| | | | |
|---|---|---|---|
| 2,589,602 A * | 3/1952 | Clark ......................... 280/13 |
| 4,251,085 A * | 2/1981 | Lageer et al. ................. 280/10 |
| 4,498,688 A | 2/1985 | Walters et al. |
| 4,589,668 A | 5/1986 | Mares |
| 4,631,877 A * | 12/1986 | Molodecki ..................... 280/8 |
| 4,679,818 A * | 7/1987 | Kakavas ................ 280/33.992 |
| 4,778,190 A * | 10/1988 | Meredith ........................ 280/8 |
| 5,328,192 A * | 7/1994 | Thompson ..................... 280/8 |
| 5,441,285 A * | 8/1995 | Russell et al. ......... 280/33.992 |
| 5,653,456 A * | 8/1997 | Mough ...................... 280/19.1 |
| 5,911,422 A * | 6/1999 | Carpenter et al. ............. 280/8 |
| 6,708,989 B1 * | 3/2004 | Braun .......................... 280/13 |
| 7,121,560 B1 * | 10/2006 | Balzano ....................... 280/11 |
| 2004/0061294 A1 | 4/2004 | Flanigan |

\* cited by examiner

*Primary Examiner*—Hau Phan

(57) ABSTRACT

A wheeled cart, such as a shopping cart, has ski elements on the wheels thereof. The ski elements can be moved between stored and use positions.

3 Claims, 1 Drawing Sheet

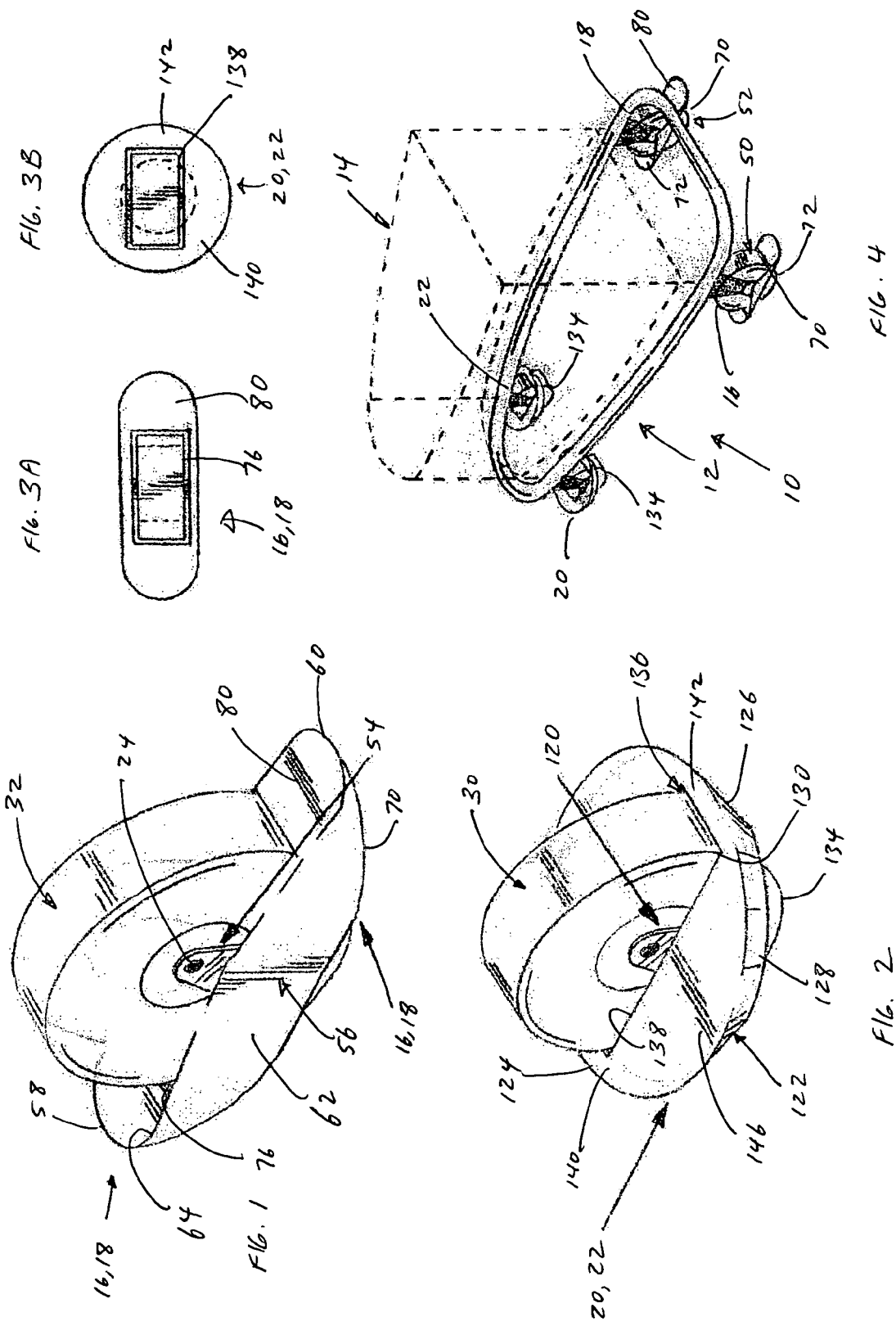

WHEEL SKI MOUNT

TECHNICAL FIELD OF THE INVENTION

The present invention relates to the general art of shopping carts, and to the particular field of wheeled shopping carts.

BACKGROUND OF THE INVENTION

Shopping carts generally have a basket for carrying the day's purchases and a handle by which the cart is pushed or pulled. In addition, shopping carts usually have at least two wheels on which the cart rolls. Therefore, the cart is mostly suitable for travel over relatively hard surfaces such as pavement or, in some cases, gravel.

Furthermore, it is known that shopping carts are utilized not only in supermarkets and other stores for carrying materials selected to a check-out counter, but are also employed to transport the purchased items to the customer's vehicle in the store's parking lot. In good weather pushing the cart through the lot is an easy task. During winter after a blanket of snow has fallen, shoppers often experience difficulties pulling or pushing shopping carts through the snow. This is due to a tendency of the wheels to sink into the snow. Therefore, when the lot is covered with ice and snow, as is the case during winter conditions in many areas, moving the cart, especially by pushing it in the normal manner, becomes difficult. In such circumstances customers may refuse to attempt to use the cart in the parking lot and may try to carry their parcels to their vehicles. Under conditions of poor footing this can lead to slipping, and accidents. Sometimes, when the customer is accompanied by another person, he or she may have that other person drive the vehicle to the store exit because it is too difficult to move the cart to the car, which can cause congestion at that location. When it is attempted to move the cart through a snowy parking lot it has been found that it is easier to pull it than to push it but this is awkward and is sometimes dangerous because the customer then often walks backward and cannot be as aware of vehicle movements in the lot as is desirable.

Therefore, there is a need to make supermarket shopping carts readily movable through supermarket parking lots despite adverse weather conditions under which the ground or pavement is covered with snow and/or ice. Furthermore, a shopping cart should be inexpensive in order to be commercially. Still further, a shopping cart should be lightweight since the cart is often used by women and children.

Therefore, there is a need for a shopping cart that can be easily moved during adverse weather conditions but which is also inexpensive and lightweight.

SUMMARY OF THE INVENTION

The above-discussed disadvantages of the prior art are overcome by a ski elements that are attached to the wheels of a shopping cart. The ski elements can be operated by means of a foot pedal so the ski elements can be lowered into position when needed.

The skis will permit the use of a shopping cart during adverse weather conditions and are also capable of being easily stowed out of the way on the cart until they are needed and are also capable of being easily moved into position for sliding. In addition, the skis included in the device embodying the present invention are easily attached to shopping carts as well as being capable of being sold as original equipment on new shopping carts. The shopping carts equipped with the skis of the present invention can be easily ganged together in the usual manner as the ski elements will not interfere with such cart combinations.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 is a perspective view of a rear shopping cart wheel embodying the present invention.

FIG. 2 is a perspective view of a front shopping cart wheel embodying the present invention.

FIG. 3A is a top view of a rear shopping cart wheel.

FIG. 3B is a top view of a front shopping cart wheel.

FIG. 4 is a perspective view of a shopping cart having the ski-equipped wheels embodying the present invention installed thereon.

DETAILED DESCRIPTION OF THE INVENTION

Referring to the figures, it can be understood that the present invention is embodied in a shopping cart wheel system 10 which overcomes the disadvantages of the prior art. System 10 comprises a carriage 12 for a shopping cart 14. The carriage includes two rear wheel supporting brackets 16 and 18 and two front wheel-supporting brackets 20 and 22.

A wheel-supporting axle, such as axle 24, is rotatably mounted on each wheel-supporting bracket. All of the axles are identical. A wheel, such as front wheel 30 and rear wheel 32, is rotatably mounted on each wheel-supporting bracket. The wheels are usual to carts, such as shopping carts and thus the function and operation of the wheels will not be described. As discussed above, in some situations, the shopping cart must be used on snow or ice covered ground. Therefore, the present invention further comprises a ski element rotatably mounted on each wheel-supporting bracket.

The ski elements include two rear ski elements, 50 and 52. The rear ski elements are identical and each rear ski element includes a pivot bracket 54 rotatably attached to the axle associated with the rear ski element and an elongate body 56 fixed to the pivot bracket. The body is made of metal and has a first end 58 which is a front end when the rear ski element is in use, a second end 60 which is a rear end when the rear ski element is in use, a side wall 62 which connects first end 58 to second end 60.

An edge 64 is a top edge when the rear ski element is in use. Edge 64 extends along first end 58 and along side wall 62. A bottom wall 70 has an opening 72 defined therethrough through which a rear wheel of the cart extends when the rear ski element is in use. A cavity 76 is defined in the body and accommodates a rear wheel of the cart when the rear ski element is in use. A planar plate 80 is located on the second end of the body and extends from second end 60 of the body toward first end 58 of the body. Plate 80 is co-planar with edge 64. Plate 80 serves as a foot rest when a user desires to operate the ski element and move it from one position to another.

The ski element on each rear wheel is movable between a first position shown in FIG. 4 for ski element 16 with the cavity opening downwardly and a second position, also shown in FIG. 4 for ski element 18 with the cavity opening upwardly. Bottom 70 of the body of the ski element on each rear wheel is located adjacent to the ground on which the associated rear wheel is located when the ski element is in the second position so the ski element will glide over snow or ice to permit easy use of the cart associated therewith.

System 10 further comprises the two front ski elements 20 and 22. Each front ski element includes a pivot bracket 120 rotatably attached to the axle associated with the front ski element. An elongate body 122 is fixed to the pivot bracket. Body 122 has a first end 124 which is a front end when the front ski element is in use, a second end 126 which is a rear end when the front ski element is in use and a side wall 128 which connects first end 124 to second end 126.

An edge 130 is a top edge when the front ski element is in use. Edge 130 extends along first end 124 and along side wall 128. A bottom wall 134 has an opening 136 defined therethrough through which a front wheel of the cart extends when the front ski element is in use. A cavity 138 is defined in body 122. Cavity 138 accommodates a front wheel of the cart when the front ski element is in use.

A planar plate 140 is located on first end 124. Planar plate 140 extends from first end 124 toward second end 126 and is co-planar with edge 130 of body 122. A second planar plate 142 is located on second end 126 of body 122. Planar plate 142 extends from second end 126 of body 122 toward first end 124 of body 122 is co-planar with edge 130 of body 122. As can be understood from FIG. 2, planar plates 140 and 142 can be one piece and can include a section 146 on edge 130.

Use of system 10 can be understood from the teaching of the foregoing disclosure. During dry weather, the ski elements are in an out-of-the way position such as shown for element 16. However, if snow or ice or the like covers the ground, a user simply pushes the ski elements into their use position with the bottom walls thereof downward as indicated for element 18 whereby the bottom wall can act like a ski. With the ski elements in position, the wheels of the cart can be lifted so they will more easily clear the ground and any obstruction on the ground. After use, the ski elements can be easily returned to a stored position so the cart can be easily stored.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A shopping cart wheel system comprising:
  A) a carriage for a shopping cart, the carriage including two rear wheel supporting brackets and two front wheel-supporting brackets;
  B) a wheel-supporting axle rotatably mounted on each wheel-supporting bracket;
  C) a wheel rotatably mounted on each wheel-supporting bracket;
  D) a ski element rotatably mounted on each wheel-supporting bracket, the ski elements including
    (1) two rear ski elements, each rear ski element including
      (a) a pivot bracket rotatably attached to the axle associated with the rear ski element,
      (b) an elongate body fixed to the pivot bracket, the body having
        (i) a first end which is a front end when the rear ski element is in use,
        (ii) a second end which is a rear end when the rear ski element is in use,
        (iii) a side wall connecting the first end of the body of the rear ski element to the second end of the body of the rear ski element,
        (iv) an edge which is a top edge when the rear ski element is in use, the edge extending along the first end of the body of the rear ski element and along the side wall of the body of the rear ski element,
        (v) a bottom wall, the bottom wall having an opening defined therethrough through which a rear wheel of the cart extends when the rear ski element is in use,
        (vi) a cavity defined in the body, the cavity accommodating a rear wheel of the cart when the rear ski element is in use, and
        (vii) a planar plate on the second end of the body, the planar plate extending from the second end of the body toward the first end of the body and is co-planar with the edge of the body of the rear ski element,
        (viii) the ski element on each rear wheel being movable between a first position with the cavity opening downwardly and a second position with the cavity opening upwardly, the bottom of the body of the ski element on each rear wheel being located adjacent to the ground on which the associated rear wheel is located when the ski element is in the second position, and
    (2) two front ski elements, each front ski element including
      (a) a pivot bracket rotatably attached to the axle associated with the front ski element,
      (b) an elongate body fixed to the pivot bracket, the body having
        (i) a first end which is a front end when the front ski element is in use,
        (ii) a second end which is a rear end when the front ski element is in use,
        (iii) a side wall connecting the first end of the body of the front ski element of the second end of the body of the front ski element,
        (iv) an edge which is a top edge when the front ski element is in use, the edge of the front ski element extending along the first end of the body of the front ski element and along the side wall of the body of the front ski element,
        (v) a bottom wall, the bottom wall of the front ski element having an opening defined therethrough through which a front wheel of the cart extends when the front ski element is in use,
        (vi) a cavity defined in the body of the front ski element, the cavity of the front ski element accommodating a front wheel of the cart when the front ski element is in use, (vii) a planar plate on the first end of the body of the front ski element, the planar plate extending from the first end of the body of the front ski element toward the second end of the body of the front ski element and is co-planar with the edge of the body of the front ski element, and (vii) a second planar plate on the second end of the body of the front ski element, the second planar plate extending from the second end of the body of the front ski element toward the first end of the body of the front ski element and is co-planar with the edge of the body of the front ski element.

2. The shopping cart wheel system defined in claim 1 wherein the first and second planar plates on the front ski elements are one-piece with each other and extend adjacent to the side walls of the front ski elements.

3. A shopping cart wheel system comprising:
A) a carriage for a shopping cart, the carriage including two rear wheel supporting brackets and two front wheel supporting brackets;
B) a wheel rotatably mounted on each wheel-supporting bracket;
D) a ski element rotatably mounted on each wheel-supporting bracket, the ski elements including
  (1) two rear ski elements, each rear ski element including
    (a) an elongate body having
      (i) a first end which is a front end when the rear ski element is in use,
      (ii) a second end which is a rear end when the rear ski element is in use,
      (iii) a side wall connecting the first end of the body of the rear ski element of the second end of the body of the rear ski element,
      (iv) a bottom wall, the bottom wall having an opening defined therethrough through which a rear wheel of the cart extends when the rear ski element is in use,
      (v) a cavity defined in the body, the cavity accommodating a rear wheel of the cart when the rear ski element is in use, and
      (vi) a plate on the second end of the body,
      (vii) the ski element on each rear wheel being movable between a first position with the cavity opening downwardly and a second position with the cavity opening upwardly, the bottom of the body of the ski element on each rear wheel being located adjacent to the ground on which the associated rear wheel is located when the ski element is in the second position, and
  (2) two front ski elements, each front ski element including
    (a) an elongate body, the body having
      (i) a first end which is a front end when the front ski element is in use,
      (ii) a second end which is a rear end when the front ski element is in use,
      (iii) a side wall connecting the first end of the body of the front ski element of the second end of the body of the front ski element,
      (iv) a bottom wall, the bottom wall of the front ski element having an opening defined therethrough through which a front wheel of the cart extends when the front ski element is in use,
      (v) a cavity defined in the body of the front ski element, the cavity of the front ski element accommodating a front wheel of the cart when the front ski element is in use, and
      (vi) a plate on the body of the front ski element.

* * * * *